(12) United States Patent
Asazu et al.

(10) Patent No.: US 9,414,117 B2
(45) Date of Patent: Aug. 9, 2016

(54) INFORMATION PROCESSING APPARATUS, INFORMATION PROCESSING METHOD AND PROGRAM

(71) Applicant: Sony Corporation, Tokyo (JP)

(72) Inventors: Hideki Asazu, Tokyo (JP); Takefumi Kitayama, Kanagawa (JP); Takehisa Souraku, Kanagawa (JP); Yasushi Tsuruta, Tokyo (JP)

(73) Assignee: Sony Corporation, Tokyo (JP)

( * ) Notice: Subject to any disclaimer, the term of this patent is extended or adjusted under 35 U.S.C. 154(b) by 42 days.

(21) Appl. No.: 14/265,798

(22) Filed: Apr. 30, 2014

(65) Prior Publication Data

US 2014/0233921 A1 Aug. 21, 2014

Related U.S. Application Data

(63) Continuation of application No. 11/518,473, filed on Sep. 8, 2006, now abandoned.

(30) Foreign Application Priority Data

Sep. 8, 2005 (JP) ................................. 2005-260313

(51) Int. Cl.
*H04H 60/33* (2008.01)
*H04H 60/56* (2008.01)
*H04N 5/445* (2011.01)
*H04N 5/76* (2006.01)
*H04N 21/45* (2011.01)
*H04H 60/27* (2008.01)
*H04H 60/46* (2008.01)
(Continued)

(52) U.S. Cl.
CPC ........... *H04N 21/4532* (2013.01); *H04H 60/27* (2013.01); *H04H 60/46* (2013.01); *H04N 9/87* (2013.01); *H04N 21/4126* (2013.01); *H04N 21/4147* (2013.01); *H04N 21/4667* (2013.01); *G06F 17/30* (2013.01); *H04H 60/65* (2013.01); *H04N 21/258* (2013.01); *H04W 8/18* (2013.01)

(58) Field of Classification Search
CPC .......... H04N 21/258; H04N 21/25891; H04N 21/44213; H04H 60/33; H04H 60/46; H04H 60/66; H04L 29/08918; H04W 8/18; G06F 17/30
See application file for complete search history.

(56) References Cited

U.S. PATENT DOCUMENTS

| 6,177,931 B1 | 1/2001 | Alexander et al. |
| 6,947,922 B1 * | 9/2005 | Glance ........................ 705/26.1 |
| 2004/0073918 A1 | 4/2004 | Ferman et al. |
| 2004/0095516 A1 | 5/2004 | Rohlicek |

FOREIGN PATENT DOCUMENTS

| JP | 2003-023589 A | 1/2003 |
| JP | 2005-080013 A | 3/2005 |

(Continued)

*Primary Examiner* — Nathan Flynn
*Assistant Examiner* — James R Marandi
(74) *Attorney, Agent, or Firm* — Chip Law Group

(57) ABSTRACT

An information processing apparatus includes an acquiring unit adapted to acquire preference information representing a user's preference based on an operation given by the user regarding content; a selecting unit adapted to select content and to designate the selected content as an object for copying; and a copying unit adapted to copy the selected content to another information processing apparatus. Further, if the object for copying is copied by the copying unit, the acquiring unit updates the preference information associated with the content of the copied object for copying.

13 Claims, 13 Drawing Sheets

(51) Int. Cl.
*H04N 9/87* (2006.01)
*H04N 21/41* (2011.01)
*H04N 21/4147* (2011.01)
*H04N 21/466* (2011.01)
*H04N 21/258* (2011.01)
*H04W 8/18* (2009.01)
*G06F 17/30* (2006.01)
*H04H 60/65* (2008.01)

(56) References Cited

FOREIGN PATENT DOCUMENTS

| | | |
|---|---|---|
| JP | 2005-160114 A | 6/2005 |
| JP | 2005-277869 A | 10/2005 |
| JP | 2005-295357 A | 10/2005 |

* cited by examiner

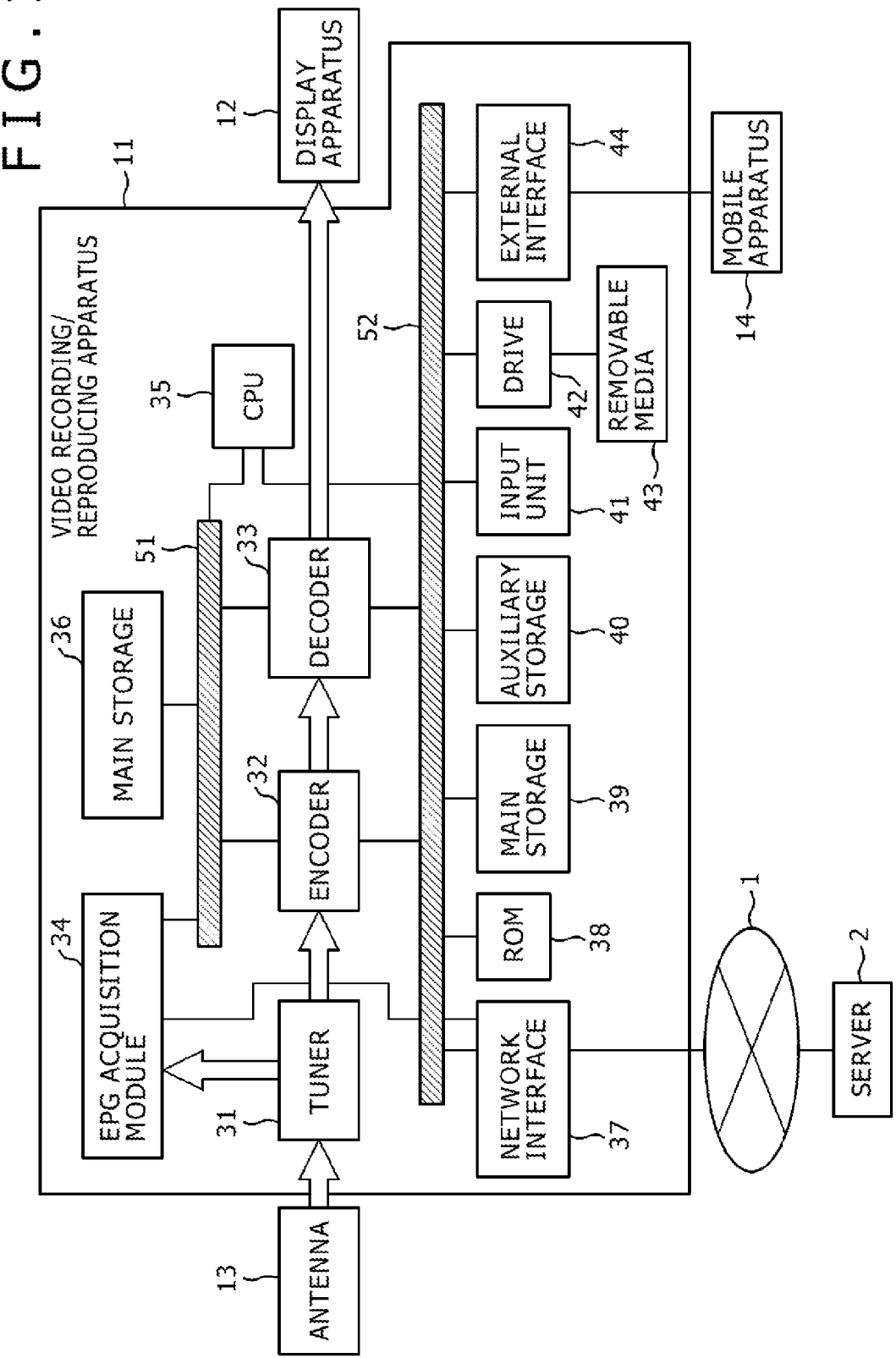

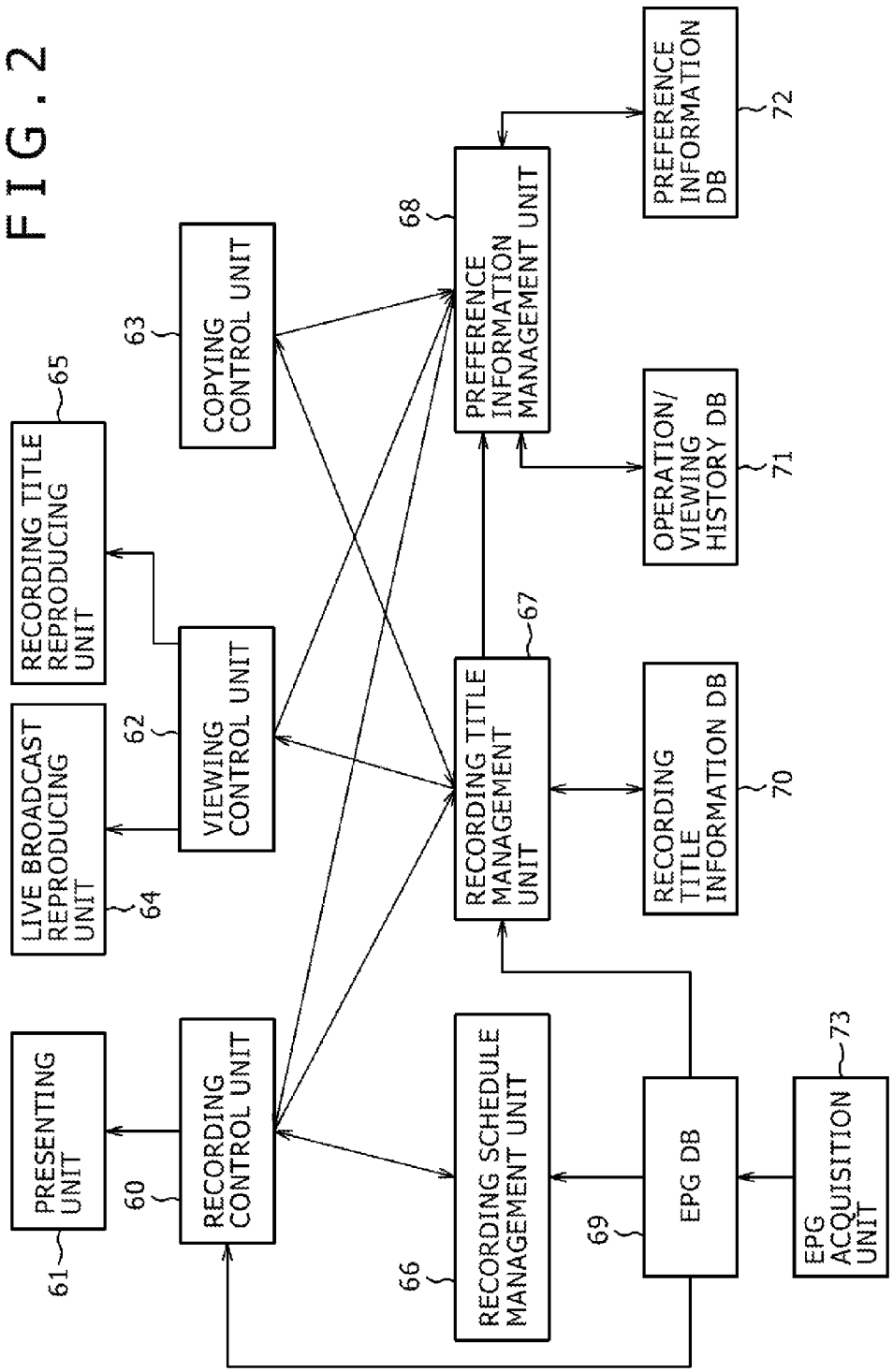

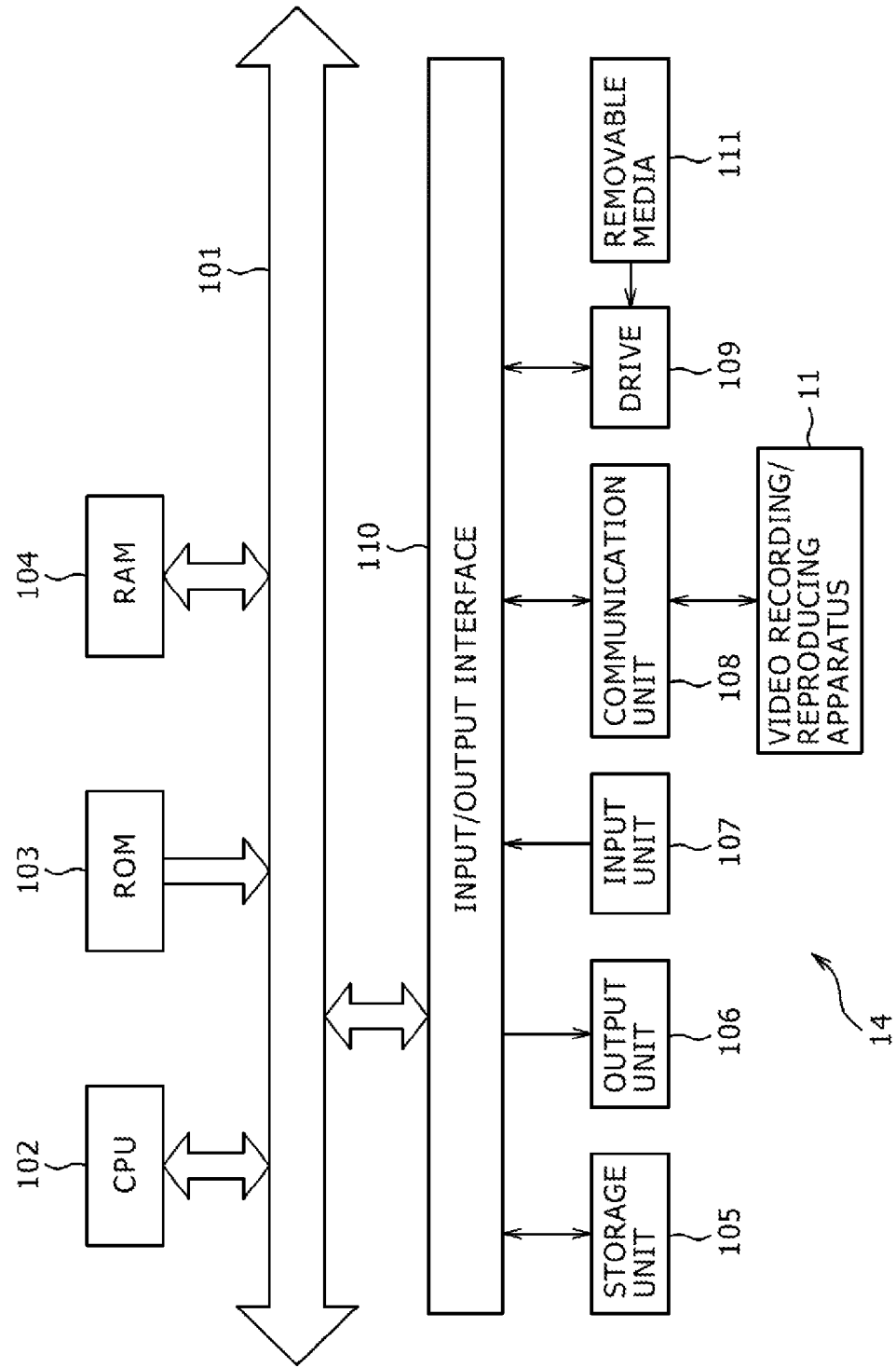

| ATTRIBUTE | CONTENT |
|---|---|
| PROGRAM ID | 00000001 |
| BROADCAST START TIME | 2000/01/01/ 01:00:00 |
| BROADCAST END TIME | 2000/01/01/ 01:30:00 |
| DISTRIBUTION SOURCE | GROUND WAVE BROADCASTING, XX–CH,YYY STATION |
| GENRE | NEWS |
| NAME | ZZZ NEWS |
| CONTENT | AAA |
| CONTENT | BBB |

311 — PROGRAM ID
312 — BROADCAST START TIME
313 — BROADCAST END TIME
314 — DISTRIBUTION SOURCE
315 — GENRE
316 — NAME
317 — CONTENT
318 — CONTENT

| ATTRIBUTE | CONTENT |
|---|---|
| TITLE ID | 00000001 |
| CUMULATIVE VIEWING TIME | 00:12:00 |
| NUMBER OF VIEWING | 2 |
| NUMBER OF OPERATION | 6 |

361 — TITLE ID
362 — CUMULATIVE VIEWING TIME
363 — NUMBER OF VIEWING
364 — NUMBER OF OPERATION

FIG.7

| 511 | SELECT TITLE TO COPY | 512 |
|---|---|---|
| ☐ | 8/4 (MON) 10:00p.m.—10:45p.m. 011ch AAA | |
| ✓ | 8/5 (TUES) 11:00p.m.—11:30p.m. 012ch BBB | |
| ✓ | 8/7 (THUR) 10:00a.m.—10:15a.m. 033ch CCC | |
| ✓ | 8/7 (THUR) 9:00p.m.—10:15p.m. 041ch DDD | |
| ☐ | 8/7 (THUR) 10:00p.m.—10:45p.m. 033ch EEE | |
| ☐ | 8/8 (FR) 9:00p.m.—10:45p.m. 061ch FFF | |
| ✓ | 8/9 (SAT) 11:30a.m.—11:45a.m. 011ch GGG | |

EXECUTION ~513    CANCEL ~514

501

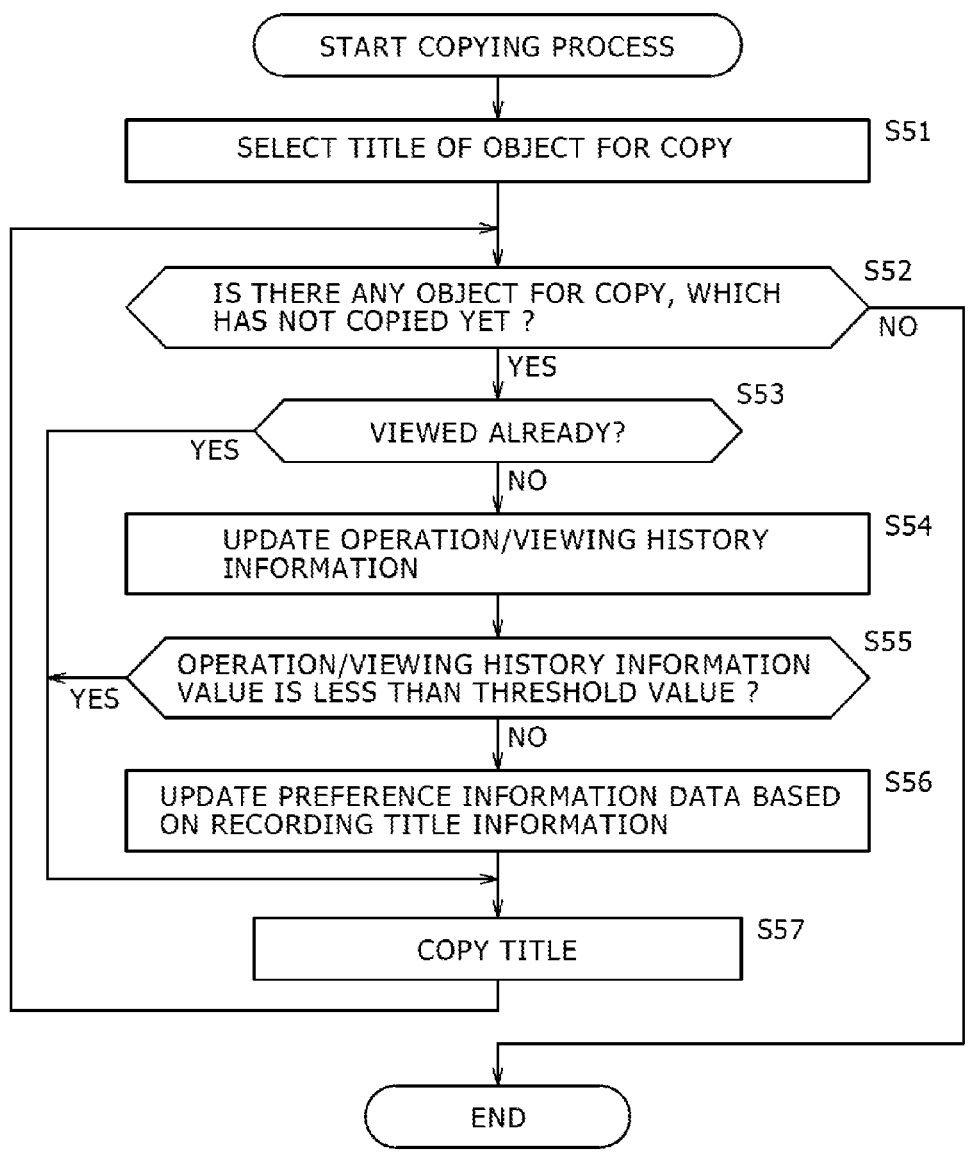

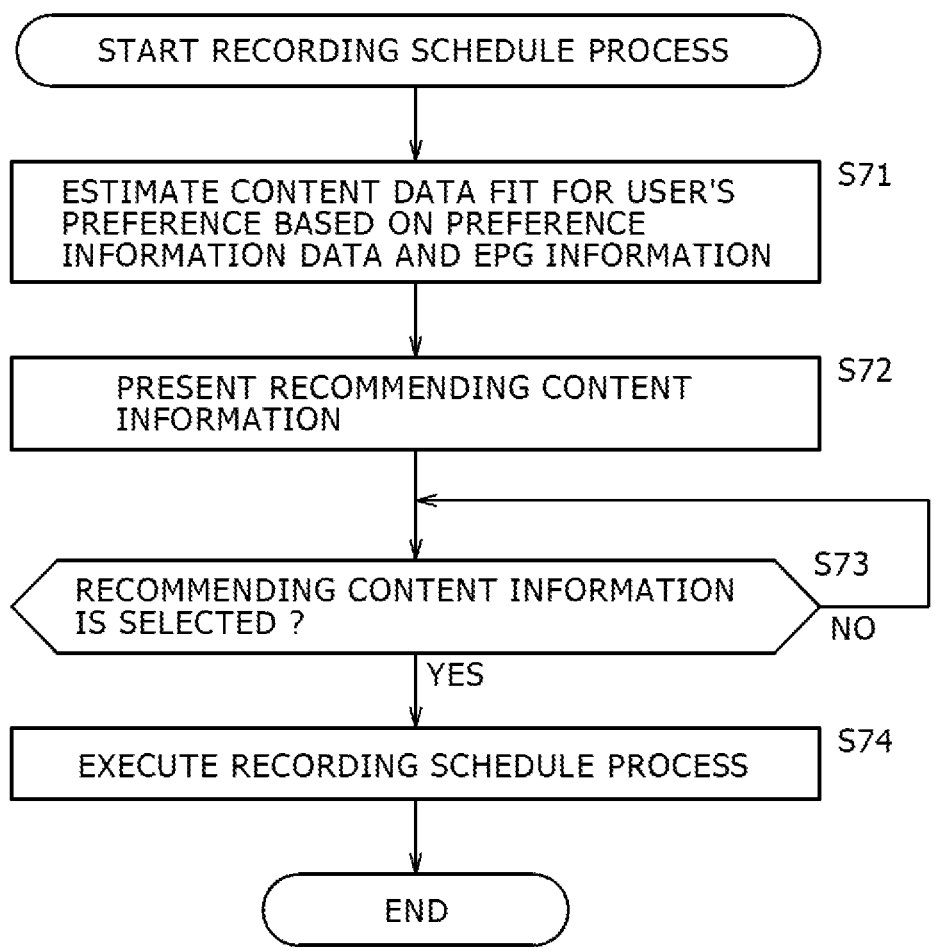

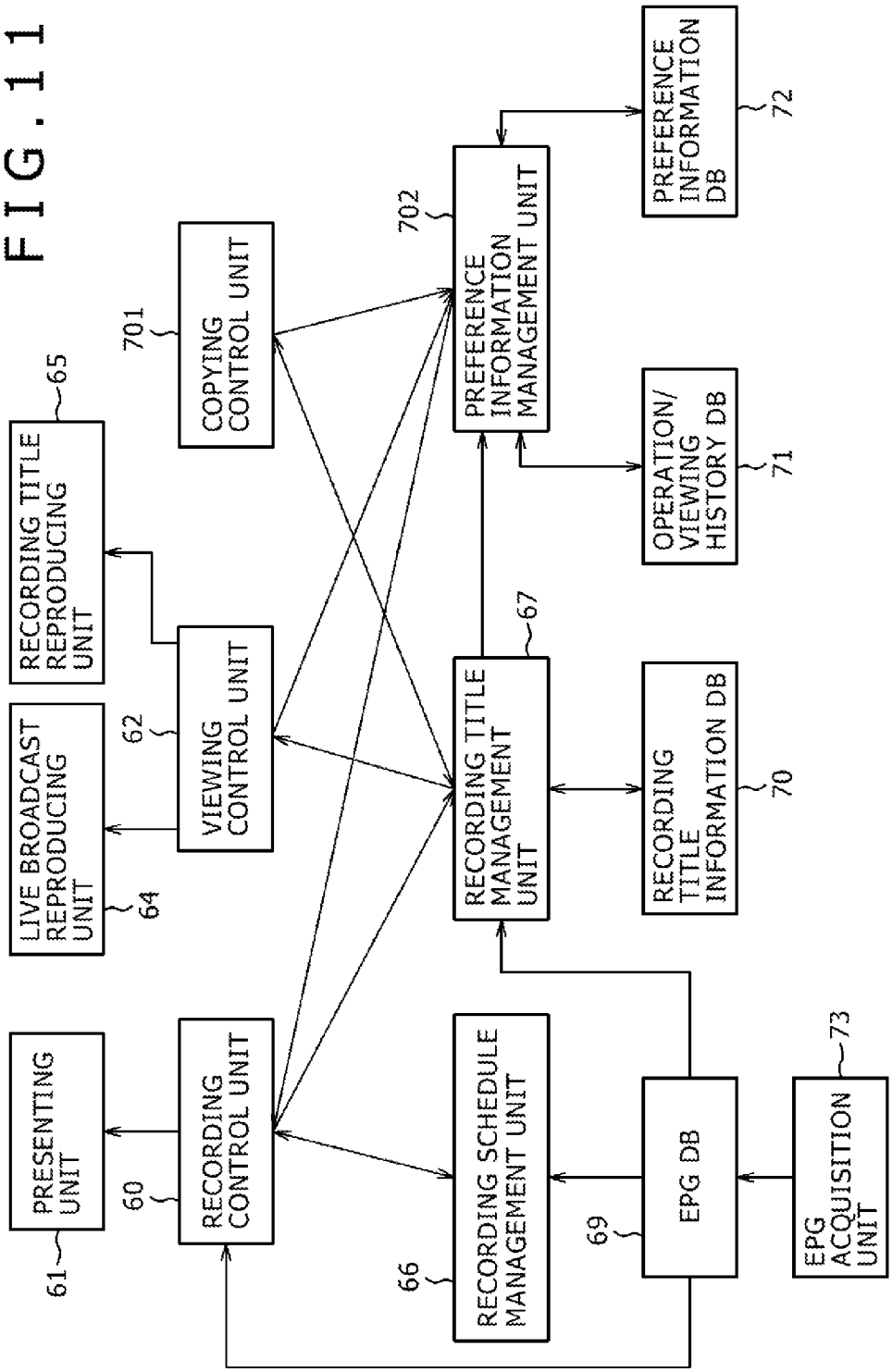

F I G . 1 2
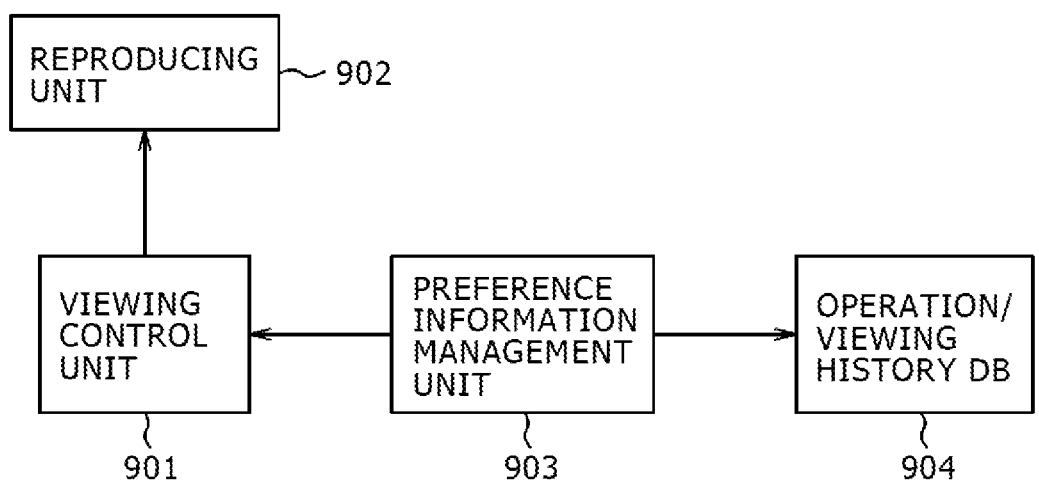

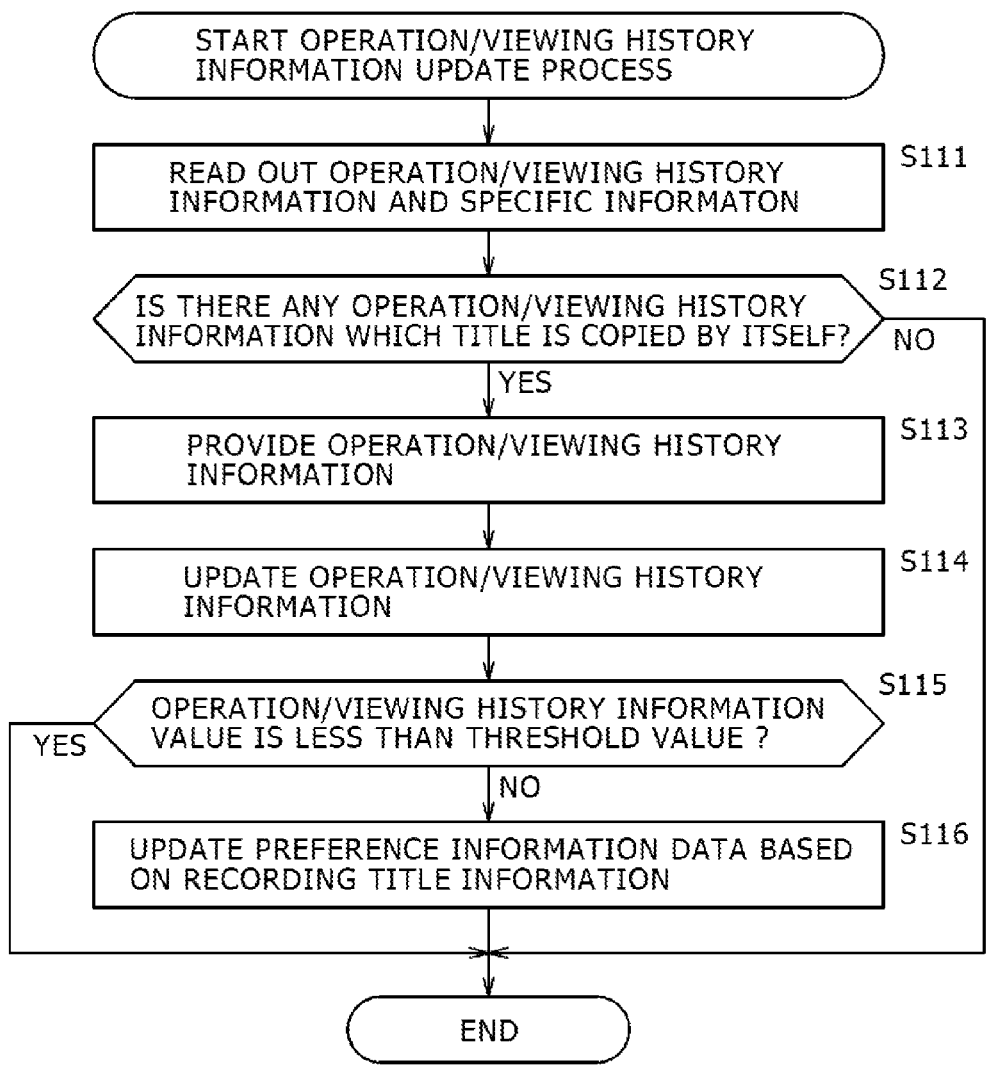

INFORMATION PROCESSING APPARATUS, INFORMATION PROCESSING METHOD AND PROGRAM

CROSS-REFERENCE TO RELATED APPLICATIONS

The present application is a continuation of U.S. application Ser. No. 11/518,473, filed on Sep. 8, 2006, which claims priority from Japanese Patent Application No. JP 2005-260313 filed on Sep. 8, 2005, all of which are hereby incorporated by reference herein.

BACKGROUND OF THE INVENTION

1. Field of the Invention

The present invention relates to an information processing apparatus, an information processing method and a program, and more particularly, to an information processing apparatus, an information processing method and a program that are all adaptable to acquire preference information representing user's preference with higher accuracy when content is copied to a another apparatus.

2. Description of Related Art

In recent years, a content player adapted to record content of television broadcasting programs etc. with a large capacity recording medium such as a hard disk incorporated is in widespread use.

Among the content players of this type, there is available a player which acquires user's preference information from a history (or an operation history) of operations (such as rewinding and fast-forwarding, for instance) given by a user in the course of replay (or viewing) of content and a viewing history of the content, so as to perform presentation and automated recording or replay of the content estimated to be fit for user's preference based on the acquired preference information (See Japanese Patent Application Publication Numbers 2005-160114, 2005-80013, 2003-23589, for instance).

Further, in the content player, content is copied (moved) to a removable media such as a DVD-R/RW (Digital Versatile Disk Recordable/Rewritable) and a DVD+R/RW.

Recently, viewing of content at outdoors etc. has become possible by copying (dubbing) the content to a mobile-type player through an external I/F (Interface) such as a USB (Universal Serial Bus) interface, and by carrying around the mobile-type player.

However, if the content is once copied from the content player to the mobile-type player, the user may use the mobile-type player more than the content player to watch the copied content. Accordingly, an inadequate amount of the operation and/or viewing history may be stored in the content player.

Further, in a case where content, which is allowed to have one authorized copy for protection of a copyright (or copy-once-content), is to be copied, the content and/or content-related information contained in the content player is erased (or moved) when copying of the content is finished. Accordingly, after the content have been once copied, no the operation and/or viewing history of the once copied content is stored.

As a result, accuracy of the preference information acquired from the operation and/or viewing history of the content decreases. Thus, it becomes difficult to present appropriate content estimated to fit for the user's preference as recommending content based on the acquired preference information.

Accordingly, it is desirable to acquire preference information representing user's preference with higher accuracy. The present invention addresses this issue.

SUMMARY OF THE INVENTION

An information processing apparatus according to one aspect of the present invention includes an acquiring unit adapted to acquire preference information representing a user's preference based on an operation given by the user regarding content; a selecting unit adapted to select content and to designate the selected content as an object for copying; and a copying unit adapted to copy the selected content to another information processing apparatus. Further, if the object for copying is copied by the copying unit, the acquiring unit updates the preference information associated with the content of the copied object for copying.

The information processing apparatus may further include an estimating unit adapted to estimate the content fit for the user's preference based on the preference information; and a presenting unit adapted to present to the user information relating to the estimated content.

The information processing apparatus may further include a receiving unit adapted to receive the estimated content; and a recording controller unit adapted to cause the received content to be recorded.

The acquiring unit may be adapted to acquire the preference information based on a number of operations representing a number at which the operation was given by the user in the course of replay of the content, a number of viewings of the content and a viewing time of the content.

The information processing apparatus may further include a deciding unit adapted to decide whether the content that is an object for copying has been viewed, wherein if a result of the decision by the deciding unit is that the content that is an object for copying has not been viewed, the acquiring unit estimates the number of operations, the number of viewings or the viewing time of the content of the object for copying in the another information processing apparatus, and updates the preference information based on the estimated number of operations, number of viewings or viewing time.

The information processing apparatus may further include a receiving unit adapted to receive the number of operations, the number of viewings or the viewing time of the content of the object for copying from the another information processing apparatus. Further, the acquiring unit updates the preference information based on the number of operations, the number of viewings or the viewing time received by the receiving unit.

In the information processing apparatus, an increase/decrease change range of a value in the number of operations, the number of viewings, or the viewing time for the content that is the object of copying in the another apparatus, which are estimated by the acquiring unit, may be changed depending on still another information processing apparatus to which the copied object for copying is sent.

An information processing method according to one aspect of the present invention includes acquiring preference information representing a user's preference based on an operation given by the user regarding content; selecting content that is an object for copying; copying the selected content to another information processing apparatus; and updating the preference information associated with the content of the copied object for copying if the object for copying is copied.

A program according to one aspect of the present invention causes a computer to perform an information processing method, the method including acquiring preference information representing a user's preference based on an operation given by the user regarding content; selecting content that is an object for copying; copying the selected content to another information processing apparatus; and updating the preference information associated with the content of the copied object for copying if the object for copying is copied.

In the above aspect of the present invention, the preference information representing the user's preference is acquired based on the operation given by the user to the content, the content that is an object for copying is selected, the selected content is copied to the another information processing apparatus, and if the object for copying is copied, the preference information associated with the content of the copied object for copying is updated.

As described the above, according to the present invention, it is possible to acquire the preference information representing the user's preference.

Further, according to the present invention, it is also possible to acquire the user's preference information with higher accuracy.

BRIEF DESCRIPTION OF THE DRAWINGS

The features and advantages of the present invention will become more apparent in the following description of presently preferred embodiments of the invention taken in conjunction with the accompanying drawings, in which:

FIG. 1 is a block diagram showing a configuration example of one embodiment of a video recording/reproducing apparatus to which the present invention is applied;

FIG. 2 is a block diagram showing a functional configuration example of a video recording/reproducing apparatus;

FIG. 3 is a block diagram showing a hardware configuration example of a mobile apparatus;

FIG. 4 is a view showing an example of program identification information;

FIG. 5 is a view showing an example of operation/viewing history information;

FIG. 7 is a view showing an example of selection display;

FIG. 9 is a flowchart for illustrating copying process;

FIG. 10 is a flowchart for illustrating recording schedule process;

FIG. 11 is a block diagram showing another functional configuration example of a video recording/reproducing apparatus;

FIG. 12 is a block diagram showing a functional configuration example of the mobile apparatus;

FIG. 14 is a flowchart for illustrating operation/viewing history information update process.

DETAILED DESCRIPTION

Figure 6:
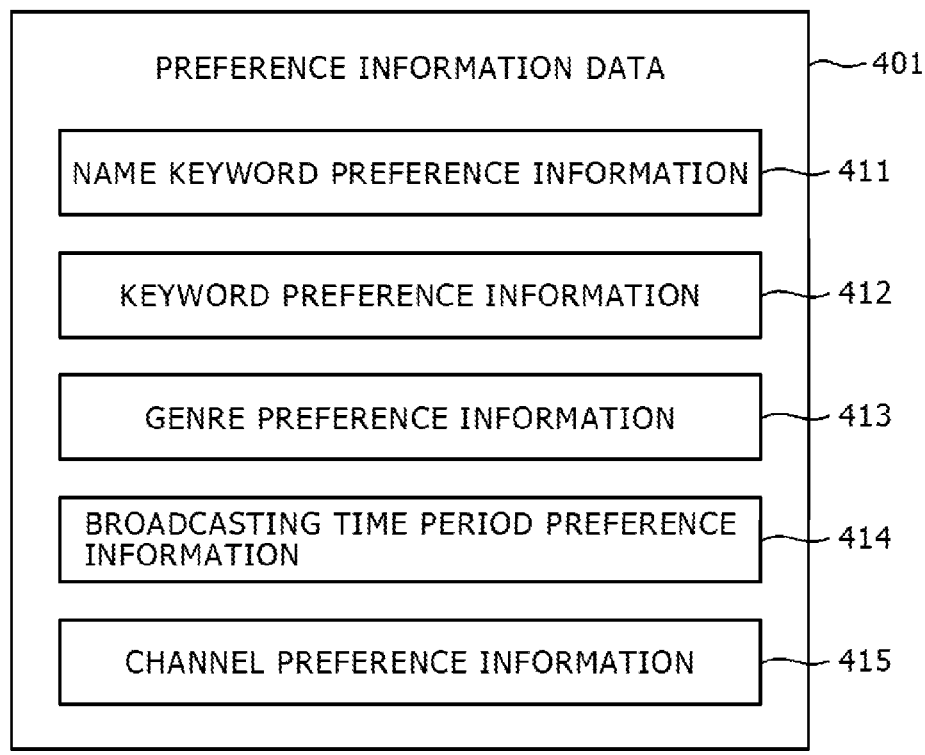
FIG. 6 is a view showing an example of preference information data.

While embodiments of the present invention are now described, it is to be understood that the following is one illustration on a correspondence between constitutional requirements of the present invention and the embodiments contained in a present specification or drawings. This is a description to ascertain that the embodiments adapted to support the present invention are contained in the present specification or drawings. Thus, although there is any other embodiment not shown herein as that meeting the constitutional requirements of the present invention, while contained in the present specification or drawings, it is not to be construed that this embodiment is referred to that meeting no constitutional requirements of the present invention. Conversely, although the embodiment shown herein is that meeting the constitutional requirements, it is not to be construed that this embodiment is referred to that meeting no constitutional requirements other than the above.

Firstly, an information processing apparatus according to one aspect of the present invention includes an acquiring unit (or a preference information management unit 68 in FIG. 2, for instance) for acquiring, based on an operation given by a user regarding content, preference information representing user's preference; a selecting unit (or a copying control unit 63 in FIG. 2 to perform processing in a step S51 in FIG. 9, for instance) for selecting content to be copied (object for copy); and a copying unit (or the copying control unit 63 in FIG. 2 to perform processing in a step S57 in FIG. 9, for instance) for copying the selected content obtained by the selecting unit to another information processing apparatus, wherein if the object for copy is copied by the copying unit, the acquiring unit updates (or processing in a step S56 in FIG. 9, for instance) the preference information associated with the content of the copied object for copy.

Secondly, the information processing apparatus according to one aspect of the present invention further includes an estimating unit (or a recording control unit 60 in FIG. 2, for instance) for estimating the content fit for the user's preference; and a presenting unit (or a presenting unit 61 in FIG. 2, for instance) for presenting, to the user, the information associated with the content estimated by the estimating unit.

Thirdly, the information processing apparatus according to one aspect of the present invention further includes a receiving unit (or a tuner 31 in FIG. 1, for instance) for receiving the estimated content obtained by the estimating unit; and a recording controller unit (or the recording control unit 60 in FIG. 2, for instance) for causing the received content obtained by the receiving unit to be recorded.

The information processing apparatus according to one aspect of the present invention allows the acquiring unit to acquire the preference information based on the number of operation representing a number at which the operation was given by the user during replay of the content, the number of viewing of the content and a viewing time of the content (or operation/viewing history information 351 in FIG. 5, for instance).

Fourthly, the information processing apparatus according to one aspect of the present invention further includes a deciding unit (or the preference information management unit 68 in FIG. 2 to perform processing in a step S53 in FIG. 9, for instance) for deciding based on the number of viewing whether or not the content that is an object for copy is viewed, wherein if a result of decision by the deciding unit is that the content that is an object for copy is not viewed, the acquiring unit estimates the number of operation, the number of viewing or the viewing time of the content of the object for copy in the another information processing apparatus, and updates the preference information based on the estimated number of operation, number of viewing or viewing time.

Fifthly, the information processing apparatus according to one aspect of the present invention further includes a receiving unit (or a copying control unit 701 in FIG. 11 to perform processing in a step S111 in FIG. 14, for instance) for receiving, from the another information processing apparatus, the number of operation, the number of viewing or the viewing time of the content of the object for copy in the another information processing apparatus, wherein the acquiring unit updates (or processing in a step S144 in FIG. 14, for instance)

the preference information based on the number of operation, the number of viewing or the viewing time received by the receiving unit.

An information processing method or a program according to one aspect of the present invention includes: acquiring (or the step S56 in FIG. 9, for instance), based on an operation given by a user regarding content, preference information representing user's preference; a selecting (or the step S51 in FIG. 9, for instance) content that is an object for copy; copying (or the step S57 in FIG. 9, for instance) the selected content to another information processing apparatus; and updating (or the step S56 in FIG. 9, for instance) the preference information associated with the content of the copied object for copy if the object for copy is copied.

Specific embodiments to which the present invention is applicable are now described in detail with reference to accompanying drawings.

FIG. 1 is a block diagram showing a configuration example of one embodiment of a video recording/reproducing apparatus 11 to which the present invention is applicable.

Referring to FIG. 1, a server 2 is connected to the video recording/reproducing apparatus 11 through a network 1 formed with Internet, a WAN (Wide Area Network) or a LAN (Local Area Network) etc.

The server 2 provides broadcasting program information (or EPG (Electric Program Guide) information) and/or network-delivered content data for the video recording/reproducing apparatus 11 through the network 1. It is to be noted that the EPG information includes information such as information representing a broadcasting schedule of programs and information used to identify the programs (which is hereinafter referred to as program identification information).

Further, a display apparatus 12, an antenna 13 and a mobile apparatus 14 are all connected to the video recording/reproducing apparatus 11. The video recording/reproducing apparatus 11 receives a broadcast wave of a program through the antenna 13, permitting program content data obtained by demodulating the received broadcast wave to be recorded and/or displayed on the display apparatus 12 after being supplied thereto. Further, the video recording/reproducing apparatus 11 also permits the recorded program content data etc. to be copied to the mobile apparatus 14.

The video recording/reproducing apparatus 11 includes the tuner 31, an encoder 32, a decoder 33, an EPG acquisition module 34, a CPU (Central Processing Unit) 35, a main storage device 36, a network interface 37, a ROM (Read Only Memory) 38, a main storage device 39, an auxiliary storage device 40, an input unit 41, a drive 42, an external interface 44, and two buses 51 and 52.

The tuner 31, the encoder 32, the decoder 33, the EPG acquisition module 34, the network interface 37, the auxiliary storage device 40 and the input unit 41 are all connected to the bus 52.

The tuner 31 demodulates the program's broadcast wave having been received through the antenna 13, causing the resultant program content data to be outputted to the encoder 32. There are some cases where the EPG information (or the broadcasting program information) is contained in a vertical blanking period of a telecast signal of the program's broadcast wave received through the antenna 13. If this is the case, the tuner 31 extracts the contained EPG information, before outputting to the EPG acquisition module 34.

The network interface 37 performs interfacing with the network 1. For instance, the network interface 37 acquires the content data through the network 1, causing the acquired content data to be supplied to the encoder 32 through the bus 52. Further, the network interface 37 is also adapted to acquire the EPG information (which may be not only the EPG information of the content data acquired through the network 1 but also the EPG information of the program corresponding to the broadcast wave received through the antenna 13) through the network 1, causing the acquired EPG information to be supplied to the EPG acquisition module 34 through the bus 52.

The encoder 32 encodes, in a MPEG (Moving Picture Experts Group) manner, for instance, the supplied program content data from the tuner 31 or the supplied content data from the network interface 37, causing the encoded content data to be stored in the auxiliary storage device 40 after being supplied thereto through the bus 52.

The auxiliary storage device 40 has a recording medium of a size providing a sufficient storage capacity, such as a hard disk, a magnetic tape, a removable disk and a flash memory, and permits the supplied content data from the encoder through the bus 52 to be stored in a storage area. It is to be noted that the content data stored in the auxiliary storage device 40 is generally referred to as a title. Further, the auxiliary storage device 40 is also adapted for storage of programs and/or data etc. supplied after being read from the removable media 43 mounted to the drive 42 described later, causing the stored programs and/or the data to be supplied to the main storage device 36 or 39 etc. based on a request from the CPU (Central Processing Unit) 35 etc.

The stored title in the auxiliary storage device 40 is outputted to the decoder 33 through the bus 52 based on an external request from the CPU 35 etc. to the auxiliary storage device 40, for instance, and is then decoded in the MPEG manner before being supplied to the display apparatus 12. It is to be noted that if the received program content data in the auxiliary storage 40 is not stored, the encoder 32 and the decoder 33 may also output, to the display apparatus 12, the outputted program content data from the tuner 31 as it is.

The EPG acquisition module 34 causes the supplied EPG information from the tuner 31 or the network interface 37 to be stored in the main storage device 36 or 39 etc. after being supplied thereto through the bus 52.

The input unit 41 includes units such as a keyboard, a mouse, a microphone and a receiving unit for receiving a command transmitted from a remote controller (not shown), and accepts a command from the user, causing the accepted command to be supplied to the CPU 35.

The CPU 35, the ROM 38 and the main storage device 39 formed with a RAM (Random Access Memory) etc., for instance, are also connected to the bus 52. Programs, data or parameters required for the CPU 35 to perform various types of processing (such as processing to control the whole video recording/reproducing apparatus 11, for instance) are properly stored in the main storage device 39. Programs to be run by the CPU 35 are contained in the ROM 38.

Further, the external interface 44 required for interfacing with the mobile apparatus 14 is also connected to the bus 52. The external interface 44 is formed with a USB interface etc., for instance, and permits the title to be copied to the mobile apparatus 14 by, after reading out the title from the auxiliary storage 40, transmitting the read title to the mobile apparatus 14 through a wired or wireless means.

Further, the drive 42 is also connected to the bus 52, and is provided with the removable media 43 such as the magnetic disk, the optical disk, a magneto-optical disk and a semiconductor memory at need. A read computer program from the removable media is installed into the auxiliary storage device 40 at need. It is to be noted that the drive 42 may also acquire the content data from the removable media 43, causing the acquired content data to be supplied to the encoder 32.

The CPU 35 is also connected to the bus 51, together with the encoder 32, the decoder 33, the EGP acquisition module 34 and the main storage device 36. The main storage device 36 is formed with the RAM etc., in which programs, data or parameters required for the CPU 35 to perform various types of processing such as control processing relating to recording schedule and video recording based on the EGP information are properly stored.

FIG. 2 is a block diagram showing a functional configuration example with emphasis placed on a software configuration of the video recording/reproducing apparatus 11 shown in FIG. 1.

The video recording/reproducing apparatus 11 shown in FIG. 2 includes the recording control unit 60, the presenting unit 61, a viewing control unit 62, the copying control unit 63, a live broadcast reproducing unit 64, a recording title reproducing unit 65, a recording schedule management unit 66, a recording title management unit 67, the preference information management unit 68, an EPG DB 69, a recording title information DB 70, an operation/viewing history DB 71 and a preference information DB 72.

It is to be noted that the EPG DB 69 is equivalent to the main storage device 39 in FIG. 1, while the recording title information DB 70, the operation/viewing history DB 71 and the preference information DB 72 are all equivalent to the auxiliary storage device 40 in FIG. 1, for instance.

The recording control unit 60 estimates the content data fit for the user's preference based on the preference information supplied from the preference information management unit 68. The recording control unit 60 also reads out program identification information 301 (See FIG. 4 described later) contained in the EPG information of the estimated content data from the EPG DB 69. With the estimated content data specified as recommending content, the recording control unit 60 causes recommending content-related information (such as a name, a broadcast start time, a broadcast end time and a broadcast content of the recommending content, for instance) (which is hereinafter referred to as recommending content information) to be displayed (or presented) on the display apparatus 12 through the presenting unit 61 based on the program identification information 301 of the specified recommending content.

At this time, the user makes a selection of the recommending content information of the recommending content to be specified as an object for recording schedule by operating the input unit 41, while taking a look at the displayed recommending content information on the display apparatus 12. Provided that the recommending content corresponding to the selected recommending content information given by the user is specified as the object for recording schedule, the recording control unit 60 controls the recording schedule management unit 66 so that a recording schedule of the specified object for recording schedule is taken.

Further, in response to information (or content of a distribution source 314 shown in FIG. 4 described later) representing the distribution source of the object for recording schedule and a recording command that are both supplied from the recording schedule management unit 66, the recording control unit 60 controls the tuner 31 so that the object for recording schedule is received. Then, the recording control unit 60 causes the received object for recording schedule to be stored (or recorded) in the auxiliary storage device 40.

The recording control unit 60 controls the recording title management unit 67 to cause the program identification information 301 contained in the EPG information corresponding to the recommending content specified as the recorded object for recording schedule to be stored as the recording title information in the recording title information DB 70.

In response to a command given by the user through the input unit 41, the viewing control unit 62 controls the live broadcast reproducing unit 64 so that the program content data being presently received through the tuner 31 or acquired from the server 2 is reproduced (or displayed).

Further, the viewing control unit 62 also causes title-related information (such as a title name, for instance) (which is hereinafter referred to as title information) to be displayed on the display apparatus 12 based on the recording title information supplied from the recording title management unit 67. At this time, the user makes the selection of the title information of the title to be specified as an object for viewing by operating the input unit 41, while taking a look at the displayed title information on the display apparatus 12. The viewing control unit 62 controls the recording title reproducing unit 65 so that the title corresponding to the selected title information given by the user is reproduced (or displayed) from the auxiliary storage device 40.

The copying control unit 63 causes a selection display 501 (see FIG. 7 described later) for selection of an object for copy to be displayed on the display apparatus 12 based on the recording title information supplied from the recording title management unit 67. At this time, the user makes the selection of the name etc. of the title of the object for copy by operating the input unit 41, while taking a look at the displayed selection display 501 on the display apparatus 12.

Provided that the title corresponding to the selected name etc. given by the user is specified as the object for copy, the copying control unit 63 reads out the object for copy from the auxiliary storage device 40, causing the read object for copy to be copied to the mobile apparatus 14 through the external interface 44. Further, the copying control unit 63 also controls the recording title management unit 67 so that the recording title information of the object for copy is supplied to the preference information management unit 68.

Under control of the viewing control unit 62, the live broadcast reproducing unit 64 causes the program content data being received through the tuner 31 or the content data being acquired through the network interface 37 to be displayed on the display apparatus 12. Under control of the viewing control unit 62, the recording title reproducing unit 65 reproduces the title contained in the auxiliary storage device 40.

Under control of the recording control unit 60, the recording schedule management unit 66 takes the recording schedule of the object for recording schedule. Specifically, the recording schedule management unit 66 reads out the program identification information 301 contained in the EPG information of the object for recording schedule from the EPG DB 69, causing the read program identification information 301 to be stored as scheduling information in an incorporated storage unit (not shown). Then, the recording schedule management unit 66 provides the information representing the distribution source of the object for recording schedule and the recording command to the recording control unit 60 at the broadcast start time of the program corresponding to the recommending content specified as the object for recording schedule based on both of the scheduling information contained in the storage unit (not shown) and a present time measured by a time measuring unit (not shown).

Under control of the recording control unit 60, the recording title management unit 67 reads out the program identification information 301 contained in the EPG information corresponding to the recorded recommending content from the EPG DB 69, causing the read program identification information 301 to be stored as the recording title information in the recording title information DB 70. Further, under control of the copying control unit 63, the recording title management unit 67 also reads out the recording title information of the title specified as the object for copy from the recording title information DB 70, causing the read recording title information to be supplied to the preference information management unit 68.

The preference information management unit 68 creates, based on the recording title information supplied from the recording title management unit 67, operation/viewing history information 351 (See FIG. 5 described later) specified as information representing an operation history and a viewing history of the title, causing the created operation/viewing history information 351 to be stored in the operation/viewing history DB 71. Further, the preference information management unit 68 also updates the operation/viewing history information 351 contained in the operation/viewing history DB 71, while monitoring the viewing control unit 62 and the copying control unit 63.

Further, the preference information management unit 68 generates (or acquires) user's preference information data 401 (See FIG. 6 described later) based on the operation/viewing history information 351 contained in the operation/viewing history DB 71, causing the acquired preference information data 401 to be stored in the preference information DB 72 before being managed. Further, the preference information management unit 68 also reads out the preference information data 401 from the preference information DB 72, causing the read preference information data to be supplied to the recording control unit 60.

An EPG acquiring unit 73 acquires the EPG information supplied from the tuner 31 or the network interface 37, causing the acquired EPG information to be stored in the EPG DB 69.

It is to be noted that when the video recording/reproducing apparatus 11 records the content data supplied through the network 1, the EPG acquiring unit 73 acquires, from the network interface 37, information supplied together with the content data to be recorded, that is, content data-related information equal to the program identification information 301, causing the acquired content data related-information to be stored in the EPG DB 69. The recording control unit 60, the recording schedule management unit 66 and the recording title management unit 67 are all adaptable to similarly process also the above content data-related information as the program identification information 301 contained in the EPG information, so that a description of the program identification information 301 will be given as that also including a description associated with the content data-related information, unless otherwise required for any description in distinction from each other.

FIG. 3 is a block diagram showing a hardware configuration example of the mobile apparatus 14 shown in FIG. 1.

Referring to FIG. 3, a CPU 102 performs various types of processing according to programs contained in a ROM 103 or programs having been loaded from a storage unit 105 into a RAM 104. Data etc. required for the CPU 102 to perform the various types of processing is also properly stored in the RAM 104.

The CPU 102, the ROM 103 and the RAM 104 are interconnected through a bus 101. An input/output interface 110 is also connected to the bus 101.

A storage unit 105 formed with the hard disk etc., an output unit 106 including units such as a display formed with a CRT (Cathode Ray Tube) or a LCD (Liquid Crystal Display) etc. and a speaker, an input unit 107 including units such as the keyboard and the mouse, and a communication unit 108 formed with a modem etc. are connected to the input/output interface 110.

The communication unit 108 performs communication with the video recording/reproducing apparatus 11. The communication unit 108 permits the title to be copied by, after receiving the title from the video recording/reproducing apparatus 11, causing the received title to be stored in the storage unit 105, for instance.

A drive 109 is also connected to the input/output interface 110 at need, and is properly provided with a removable media 111 such as the magnetic disk, the optical disk, the magneto-optical disk and the semiconductor memory, permitting the read computer program from the removable media to be installed into the storage unit 105 at need.

FIG. 4 shows an example of program identification information 301 in the EPG information stored in the RPG DB 69 shown in FIG. 2.

Referring to FIG. 4, the program identification information 301 is given as a group of various types of program-related information formed with two items, "attribute" representing types of information and "content" thereof. As shown in FIG. 4, the program identification information 301 contains information of attributes including a program ID (or an identification code) 311, a broadcast start time 312, a broadcast end time 313, a distribution source 314, a genre 315, a name 316, and content 317 and 318, for instance.

The program ID 311 shows an ID for identifying the program programmed to be broadcast. The program identification information 301 shown in FIG. 4 gives the content of the program ID 311 as "00000001", for instance. The broadcast start time 312 and the broadcast end time 313 respectively show information representing a broadcast schedule of the program to be broadcast. The program identification information 301 shown in FIG. 4 gives the content of the broadcast start time 312 as "2001/01/01 01:00:00", and the content of the broadcast end time 313 as "2001/01/01 01:30:00", for instance.

It is to be noted that for the content data-related information, the broadcast start time 312 and the broadcast end time 313 may be in blank, or it is also allowable to use information representing a schedule of the content data to be released for the public in the server.

The distribution source 314 shows information representing the distribution source of the program. The program identification information 301 shown in FIG. 4 gives the content of the distribution source 314 as "ground wave broadcasting, XX-channel, and YYY station", which indicates that the program corresponding to the program identification information 301 is a program having been sent on the air from the YYY station as a broadcast program in the XX-channel involved in the ground wave broadcasting, for instance. It is to be noted that for the content data-related information, the distribution source 314 needs to be given a description of an address etc. of the server that is releasing the content data for the public.

The genre 315 shows information representing the genre (or a category) of the program content, and the program identification information 301 shown in FIG. 4 gives the content of the genre 315 as "News", for instance. The name 316 shows information representing a name of the program, and the program identification information 301 shown in FIG. 4 gives the content of the name 316 as "ZZZ News", for instance.

The content 317 and 318 respectively show information of characteristic keywords representing the program content, and the program identification information 301 shown in FIG. 4 gives the content of the content 317 as "AAA", and the content of the content 318 as "BBB", for instance.

It is to be noted that the program identification information 301 may be in the form of information including other information than the information shown in FIG. 4, or that consisting of a part of the information shown in FIG. 4. Alternatively, information contained in the program identification information 301 may be in the form of hierarchical-structured information.

The recording title information is referred to the program identification information 301 of the title, that is, the same group of information as the program identification information 301 shown in FIG. 4 is contained in the recording title information, so that its description is passed over.

FIG. 5 shows an example of operation/viewing history information 351 contained in the operation/viewing history DB 71 shown in FIG. 2.

Referring to FIG. 5, the operation/viewing history information 351 is given as a group of various types of information representing the operation history and the viewing history of the title and including two items, "attribute" representing types of information, and "content" thereof. As shown in FIG. 5, the operation/viewing history information 351 contains information of attributes including a title ID 361, a cumulative viewing time 362, the number of viewing 363 and the number of operation 364, for instance.

The title ID 361 shows the content of the program ID 311 (See FIG. 4) of the program identification information 301 of the program corresponding to the title. The operation/viewing history information 351 shown in FIG. 5 gives the content of the title ID 361 as "00000001", for instance. The cumulative viewing time 362 shows information representing a cumulative time that the title was viewed. The operation/viewing history information 351 shown in FIG. 5 gives the content of the cumulative viewing time 362 as "00:12:00 (12 minutes)", for instance.

The number of viewing 363 shows information representing a number at which the title was viewed (or reproduced), and the number of operation 364 shows information representing a number at which the operation (or the operation other than the operation required for replay) was given by the user in the course of replay of the title. The operation/viewing history information 351 shown in FIG. 5 gives the content of the number of viewing as "2", and the content of the number of operation 364 as "6", for instance.

It is to be noted that the operation/viewing history information 351 may be in the form of information including other information than the information shown in FIG. 5, or that consisting of a part of the information shown in FIG. 5. Alternatively, the information contained in the operation/viewing history information 351 may be in the form of hierarchical-structured information.

FIG. 6 shows an example of preference information data 401 contained in the preference information DB 72 shown in FIG. 2.

Referring to FIG. 6, the preference information data 401 includes, for instance, name keyword preference information 411 specified as the preference information data managed with the name as a key, keyword preference information 412 specified as the preference information data managed with the title content as the key, genre preference information 413 specified as the preference information data managed with the title genre as the key, broadcasting time period preference information 414 representing the preference information data managed with a title broadcasting time period as the key, and channel preference information 415 specified as the preference information data managed with a channel having broadcasted the title (when the title is of the acquired content data from the server 2, the server etc. having released the acquired content data for the public is required as the key) as the key.

Specifically, each of the name keyword preference information 411, the keyword preference information 412, the genre preference information 413, the broadcasting time period preference information 414 and the channel preference information 415 is in the form of a table including a group of records managed with the attribute contained in the recording title information as the key, and requires that a score representing a degree of user's preference is appended on a record basis.

The name keyword preference information 411 is given as the table with the content of the title 316 shown in FIG. 4 as the key, and includes a keyword (or the content of the name 316) and the score (or the degree of user's preference) with respect to the keyword.

The keyword preference information 412 is given as the table with the entities of the content 317, 318 shown in FIG. 4 or words contained in a detailed description (such as a description of the content and a cast etc. of the program) of the title as the key, and includes the keyword (or the words contained in the entities of the content 317, 318) and the score with respect to the keyword.

The genre preference information 413 is given as the table with the content (such as variety, news, drama, documentary, sports, music, and education etc.) of the genre 315 shown in FIG. 4 as the key, and includes the keyword (or the content of the genre 315) and the score with respect to the keyword.

The broadcasting time period preference information 414 is given as the table with the broadcast start time 312 and/or the broadcast end time 313 shown in FIG. 4 as the key, and includes the broadcasting time period of the title obtained from the content of the broadcast start time 312 and/or the broadcast end time 313 and the score with respect to the broadcasting time period. In particular, the programs have features in program arrangements depending on the broadcasting time period, so that the broadcasting time period preference information 414 relating to the broadcasting time period described the above is used to represent the user's preference.

The channel preference information 415 is given as the table with the content of the distribution source 314 shown in FIG. 4 as the key, and includes the information, such as the channel having broadcasted the title (when the title is of the acquired content data from the server 2, the name of the server etc. having released the acquired content data for the public is also required), obtained from the content of the distribution source 314 and the score with respect to the information. In particular, the programs have features in programming for each broadcasting station (or each channel), so that the channel preference information 415 relating to the channel is used to represent the user's preference.

These scores need to be set based on the operation/viewing history information 351 (See FIG. 5) contained in the operation/viewing history DB 71 shown in FIG. 2 in a manner that provides higher values for the name keyword, the program content keyword, the genre, the broadcasting time period and the channel that are all contained in the recording title information corresponding to the title having been viewed or operated by the user, while providing lower values for the name keyword, the program content keyword, the genre, the broadcasting time period and the channel that are all contained in the recording title information corresponding to the title remaining to be viewed or operated by the user.

Specifically, setting of the scores is given in a calculating manner that permits the score with respect to each component (such as the name keyword, the program content keyword, the genre, the broadcasting time period and the channel) contained in the recording title information corresponding to the title having been viewed by the user to be incremented by 1, while providing no increment for the score with respect to each component contained in the recording title information corresponding to the title remaining to be viewed by the user. In this case, the higher the score is, the higher the degree of preference of a corresponding item (such as the name keyword, the program content keyword, the genre, the broadcasting time period and the channel) becomes attainable.

It is to be noted that the score calculating manner is not limited to the above, and any other calculating manner may be also taken. Specifically, it is also allowable to take a manner that decrements the score of each item contained in the recording title information supposed to be unnecessary to be viewed or operated by the user, or alternatively, that gives weighting to the score for each item.

FIG. 7 shows an example of a selection display 501 displayed on the display apparatus 12 by the copying control unit 63 shown in FIG. 2.

The selection display 501 shown in FIG. 7 includes a check box 511, a recording title information display unit 512, an execution button 513 and a cancel button 514.

The check box 511 is equivalent to the recording title information display unit 512, and is operated (or checked) when the user selects, as the object for copy, the title corresponding to the displayed recording title information (or information contained therein) on the recording title information display unit 512.

The recording title information display unit 512 provides display of the whole or a part of the recording title information. In one display in FIG. 7, there are shown the broadcast start time, the broadcast end time and the name among the components of the recording title information. Specifically, the entities of the broadcast start time 312, the broadcast end time 313 and the name 316 all contained in the program identification information 301 shown in FIG. 4 are displayed.

The execution button 513 is selected (or operated) when the user puts copying of the title corresponding to each checkmarked check box 511 into execution. When the execution button 513 is selected by the user, the copying control unit 63 causes a message describing that copying is started to be displayed on the display apparatus 12. The cancel button 514 is selected when the user puts selection of the object for copy to a stop.

Reproducing process to be performed by the video recording/reproducing apparatus 11 shown in FIG. 2 is now described with reference to FIG. 8. This reproducing process is started when a command to reproduce (or watch) the title was given through the operation of the input unit 41 by the user, for instance.

In a step S31, the preference information management unit 68 shown in FIG. 2 executes an initialization process. For instance, the preference information management unit 68 initializes setting of a timer (not shown) for measuring the viewing time and a counter (not shown) for counting the number of operation.

The processing in the step S31 is followed by a step S32, where the preference information management unit 68 causes the timer (not shown) to start measurement of the viewing time according to a start timing for replay of the title, while monitoring the viewing control unit 62, before the process goes on to a step S33.

In the step S33, the preference information management unit 68 decides whether or not input of any replay-related operation (such as temporary stop, rewinding, fast-forwarding) other than the operation adapted to issue the replay command has been given to the input unit 41 by the user, while monitoring the viewing control unit 62. When a result of decision is that the input of the replay-related operation has been given, the process goes on to a step S34.

In the step S34, the processing to cause a value of the counter (not shown) for counting the number of operation to be counted up by "+1" is performed, and is followed by a step S35.

Conversely, when the result of decision in the step S33 is that no input of the replay-related operation other than the operation adapted to issue the replay command has been given to the input unit 41 by the user yet, the process skips the step S34 to go on to a step S35.

In the step S35, the preference information management unit 68 decides whether or not the replay of the title is finished, that is, the replay of the title has been put to a stop in response to the command from the user, or the replay of all the titles of the object for replay (or viewing) is finished, while monitoring the viewing control unit 62. When the result of decision in the step S35 is that no replay of the title is finished yet, the process is returned to the step S33, causing the above processing to be repeated until the replay of the title is finished.

Conversely, when the result of decision in the step S35 is that the replay of the title is finished, the process goes on to a step S36, where the preference information management unit 68 brings the operation of the timer (not shown) to a stop, leading to a termination of measurement of the viewing time.

The process in the step S36 is followed by a step S37, where the preference information management unit 68 acquires a count value available at the present time from the counter (not shown), before the process goes on to a step S38. In the step S38, the preference information management unit 68 updates the entities of the operation/viewing history information 351 contained in the operation/viewing history DB 71 based on the measured viewing time obtained by the timer (not shown) and the acquired count value obtained from the counter (not shown).

Specifically, the preference information management unit 68 gives a sum of the content (or a value) of the present cumulative viewing time 362 and the measured viewing time as an updated value of the cumulative viewing time 362. Also, the preference information management unit 68 increments the value of the present number of viewing 363 by 1. Further, the preference information management unit 68 also gives a sum of the content (or a value) of the present number of operation 364 and the measured count value as an updated value of the number of operation 364.

It is to be noted that when each of the updated values of the cumulative viewing time 362, the number of viewing 363 and the number of operation 364 all contained in the operation/viewing history information 351 is not less than a prescribed threshold value, the preference information management unit 68 reads out the recording title information of the present object for replay from the recording title information DB 70 through the recording title management unit 67, and updates the preference information data 401 contained in the preference information DB 72 based on the read recording title information.

A copying process required for the video recording/reproducing apparatus 11 shown in FIG. 2 to copy the title to the mobile apparatus 14 is now described with reference to FIG. 9. This copying process is started when a copying command was given through the operation of the input unit 41 by the user to select the execution button 513 after checking the check box 511 of the selection display 501 shown in FIG. 7.

In a step S51, the copying control unit 63 selects the title to be specified as the object for copy in response to the command supplied through the input unit 41. For instance, the copying control unit 63 selects the title corresponding to the check box 511 having been checked by the user as the title to be specified as the object for copy.

The processing in the step S51 is followed by a step S52, where the copying control unit 63 decides whether or not there is the object for copy still remaining to be copied. When the result of decision is that there is the object for copy still remaining to be copied, the copying control unit 63 specifies, as a present object for copy, one of the objects for copy still remaining to be copied, before the process goes on to a step S53.

In the step S53, the preference information management unit 68 decides based on the operation/viewing history information 351 whether or not the present object for copy has been already viewed. For instance, the preference information management unit 68 reads out, from the operation/viewing history DB 71, the operation/viewing history information 351 having the same content of the title ID 361 as that of the program ID 311 of the title information of the present object for copy, and decides whether or not the content of the number of viewing 363 in the operation/viewing history information 351 is not less than 1.

Figure 8:
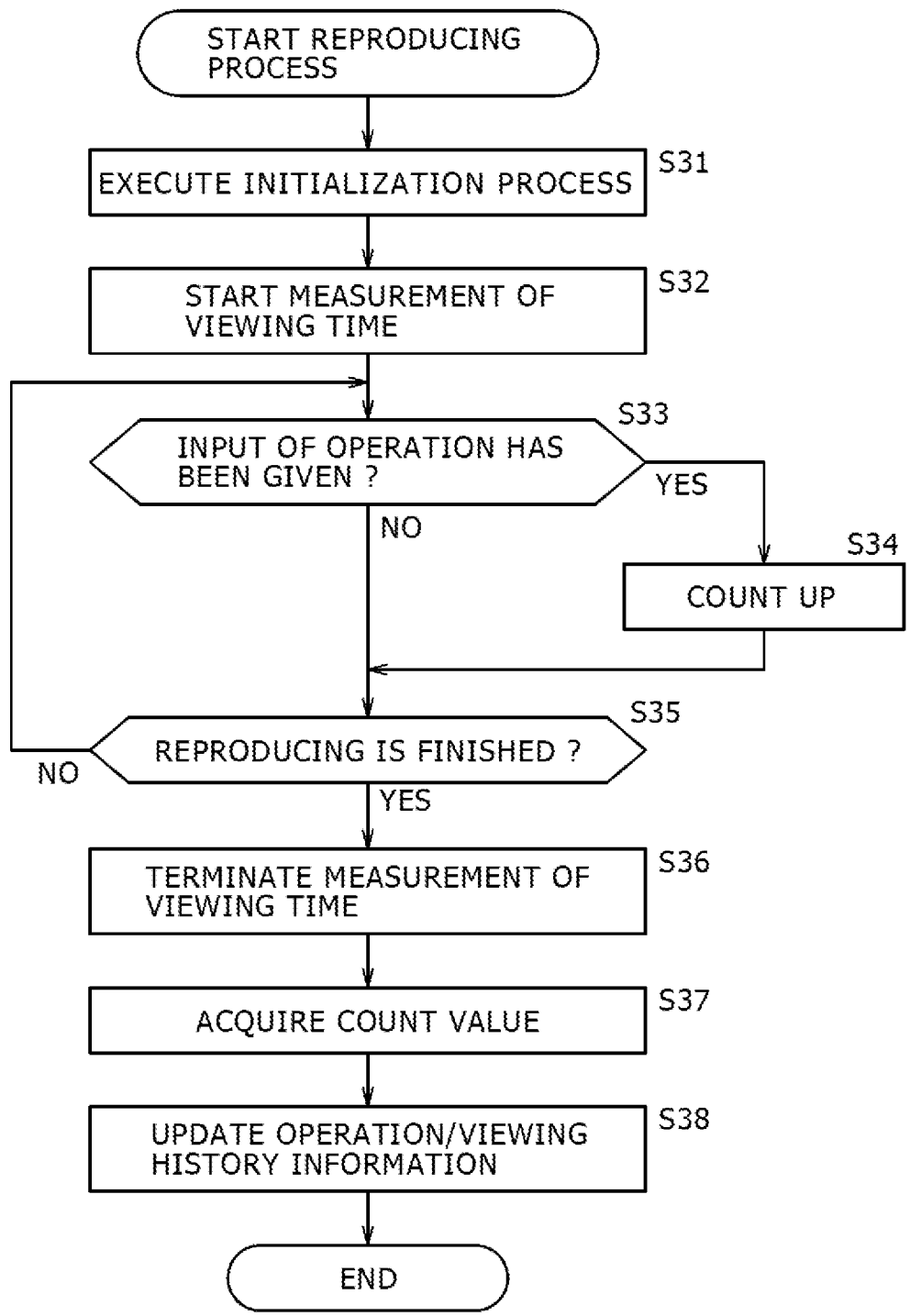
FIG. 8 is a flowchart for illustrating reproducing process.

When the result of decision in the step S53 is that the present object for copy has been already viewed, or when updating of the entities of the cumulative viewing time 362, the number of viewing 363 or the number of operation 364 is already finished in the reproducing process in FIG. 8, the process skips steps S54 to S56 to go on to a step S57.

Conversely, when the result of decision in the step S53 is that the present object for copy has not been viewed yet, the process goes on to the step S54, where the preference information management unit 68 estimates the time and the number of times at which the title would be viewed by the user or the number of times at which the operation would be given by the user after copying of the title to the mobile apparatus 14, and updates the operation/viewing history information 351 contained in the operation/viewing history DB 71.

For instance, the preference information management unit 68 updates the operation/viewing history information 351 in a manner that determines an increment or decrement range of values of the cumulative viewing time 362, the number of viewing 363 and the number of operation 364 based on a predefined function required to take, as parameters, the values of the cumulative viewing time 362, the number of viewing 363 and the number of operation 364.

After the user has completed copying of the title to the mobile apparatus 14, the preference information management unit 68, for instance, increments the value of the number of viewing 363 in the operation/viewing history information 351 by 1 based on the function required to take, as a parameter, the value of the number of viewing 363 having been estimated that the user would be sure to once watch the copied title.

It is to be noted that the above function may be also given to be variable depending on a copying destination. In this case, when the copying destination is specified as the removable media 43, for instance, it is allowable to provide a smaller increment range of the values of the cumulative viewing time, 362, the number of viewing 363 and the number of operation 364 as compared with the case where the copying destination is specified as the mobile apparatus 14, in consideration of a possibility that the copying of an unscheduled title to be viewed is also involved as a temporary measure.

The processing in the step S54 is followed by a step S55, where the preference information management unit 68 decides whether or not the values of the cumulative viewing time 362, the number of viewing 363 and the number of operation 364 in the operation/viewing history information 351 are less than the prescribed threshold value. When the result of decision is that the above values are less than the prescribed threshold value, the process skips a step S56 to go on to a step S57.

Conversely, when the result of decision is that the values of the cumulative viewing time 362, the number of viewing 363 and the number of operation 364 in the operation/viewing history information 351 are not less than the prescribed threshold value, the process goes on to the step S56, where the preference information management unit 68 reads out the recording title information of the present object for copy from the recording title information DB 70 through the recording title management unit 67, and updates the preference information data 401 contained in the preference information DB 72 based on the read recording title information. In other words, the preference information management unit 68 permits the preference information data 401 associated with the present object for copy to be updated based on the recording title information.

The processing in the step S56 is followed by a step S57, where the copying control unit 63 reads out the present object for copy from the auxiliary storage device 40, and copies the present object for copy to the mobile apparatus 14 by providing the read object for copy to the mobile apparatus 14 through the external interface 44. Then, the process is returned to the step S52, causing the above processing to be repeated until copying of all the objects for copy is finished.

Conversely, when the result of decision in the step S52 is that there is no object for copy still remaining to be copied, or that copying of all the objects for copy is finished, the process is brought to an end.

It is to be noted that while the above step S53 is required for the preference information management unit 68 to, by deciding whether or not the content of the number of viewing 363 is not less than 1, decide whether or not the present object for copy has been already viewed, it is also allowable to decide whether or not the content of the cumulative viewing time 362, for instance, exceeds 50% of a time (which is hereinafter referred to as a total viewing time) required for the user to watch all the titles specified as the object for copy. In this case, in the step S54, the preference information management unit 68 updates the content of the cumulative viewing time 362 to provide the content as much as 50 or 100% of the total viewing time. When the content of the cumulative viewing time 362 of the present object for copy is as much as 10% of the total viewing time, for instance, the preference information management unit 68 causes the content of the cumulative viewing time 362 to be incremented by an amount as much as 40 or 90% of the total viewing time.

When not only the number of operation 361 but also the operation content history needs to be stored as the operation/viewing history information 351, the preference information management unit 68 may also update the content of the operation/viewing history information 351 based on the stored operation content history.

An operation such as fast-forwarding at short intervals or skipping for 15 sec., when repeatedly given by the user earlier than copying, for instance, is supposed to be that frequently taken for the purpose of skipping over a commercial (CM) part contained in the object for copy. In this case, the preference information management unit 68 updates the operation/viewing history information 351, on the presumption that the user would also watch the object for copy at a probability as high as 70% after a completion of copying. Alternatively, an edit operation, when repeatedly given by the user earlier than copying, for instance, is supposed to be that frequently taken for the purpose of cutting the CM part contained in the object for copy and/or effecting a cut operation to leave only a desired part contained therein. In this case, the preference information management unit 68 updates the operation/viewing history information 351 on the presumption that the user would also watch the object for copy over and over after the completion of copying.

Further, when no operation is given for a long period of time since a last operation having been given by the user to watch a beginning part of the object for copy only for a short period of time (or 10 sec., for instance) earlier than copying, the preference information management unit 68 updates the operation/viewing history information 351 on the presumption that the user would no more watch the object for copy after the completion of copying.

Also, while the above step S53 decides whether or not the present object for copy has been already viewed, it is also allowable to decide whether or not the entities of the cumulative viewing time 352, the number of viewing 363 or the number of operation 364 in the operation/viewing history information 351 of the present object for copy are not less than the threshold value.

As described the above, when the title is copied to the mobile apparatus 14, the preference information management unit 68 estimates the viewing time, the number of viewing and the number of operation of the title in the mobile apparatus 14, updates the operation/viewing history information 351, and causes the preference information data 401 to be updated based on the updated operation/viewing history information 351. Accordingly, in the case where copying of the title to the mobile apparatus 14 serving as the another apparatus is effected, the storage of the operation and/or viewing history of the copied title is also ensured, causing creation of more exact preference information data 401 to be attained.

Recording schedule process required for the video recording/reproducing apparatus 11 in FIG. 2 to take the recording schedule of the content data is now described with reference to FIG. 10. This recording schedule process is started when a recording schedule command was given by operating the input unit 41 by the user, for instance.

In a step S71, the recording control unit 60 in FIG. 2 estimates the content data that would fit for the user's preference based on both of the preference information data 401 supplied from the preference information management unit 68 and the program identification information 301 contained in the EPG DB 69.

When the key corresponding to the score of not less than the prescribed value in the name keyword preference information 411, the keyword preference information 412, the genre preference information 413, the broadcasting time period preference information 414 or the channel preference information 415 is contained in the name 316, the content 317 and 318, the genre 315, the broadcast start time 312, the broadcast end time 313 or the distribution source 314, for instance, the recording control unit 60 estimates the content data corresponding to the above program identification information 301 as the content data fit for the user's preference.

Then, with the estimated content data specified as the recommending content, the recording control unit 60 supplies the recommending content information to the presenting unit 61 based on the program identification information 301 of the specified recommending content.

The processing in the Step S71 is followed by a step S72, where the presenting unit 61 presents (or displays) the recommending content information from the recording control unit 60 on the display apparatus 12. At this time, the user makes the selection of the recommending content information of the content data to be specified as the object for recording schedule by operating the input unit 41, while taking a look at the presented recommending content information on the display apparatus 12.

The processing in the step S72 is followed by a step S73, where the recording schedule control unit 60 decides based on the command given from the user through the input unit 41 whether or not the user has made the selection of the recommending content information of the content data to be specified as the object for recording schedule. When the result of decision is that the user has made no selection of the recommending content information, the recording schedule control unit 60 is placed in a wait state until the recommending content information is selected.

Conversely, when the result of decision in the step S73 is that the user has made the selection of the recommending content information of the content data to be specified as the object for recording schedule, the recording control unit 60 provides the content of the program ID 311 of the object for recording schedule, before the process goes on to a step S74.

In the step S74, the recording schedule management unit 66 takes the recording schedule by, after acquiring the program identification information 301 of the object for recording schedule from the EPG DB 69 based on the content of the program ID 311 from the recording control unit 60, causing the acquired information to be stored in the incorporated storage unit.

After the completion of the recording schedule, the recording schedule management unit 66 supplies the information representing the content of the distribution source 314 and the recording command to the recording control unit 60 at the broadcast start time of the object for recording schedule based on both of the content of the broadcast start time 312 of the program identification information 301 contained in the incorporated storage unit and the measured present time given by the time measuring unit (not shown). The recording control unit 60 controls the tuner 31 to receive the object for recording schedule at the broadcast start time based on both of the information representing the content of the distribution source 314 and the recording command, causing the received object for recording schedule to be stored in the auxiliary storage device 40.

After the completion of the storage of the object for recording schedule in the auxiliary storage device 40, the recording control unit 60 supplies the content of the program ID 311 of the program identification information 301 of the object for recording schedule to the recording title management unit 67. The recording title management unit 67 reads out the program identification information 301 of the object for recording schedule from the EPG DB 69 based on the content of the program ID 311, causing the read program identification information to be stored as the recording title information in the recording title information DB 70 before providing the program ID of the recording title information to the preference information management unit 68.

The preference information management unit 68 creates, based on the program ID supplied from the recording title management unit 67, the operation/viewing history information 351 of the object for recording schedule requiring that the supplied program ID is specified as the content of the title ID 361, causing the created operation/viewing history information to be stored in the operation/viewing history information DB 71.

As described the above, the video recording/reproducing apparatus 11 in FIG. 2 permits the content data fit for the user's preference to be estimated based on the preference information data 401, and with the estimated content data specified as the recommending content, causes the recommending content information of the specified recommending content to be presented. Thus, creation of the more exact preference information data 401 in the above copying process in FIG. 9 is supposed to be adaptable to provide the recommending content more fit for the user's preference for the user.

Accordingly, in the case where the title contained in the video recording/reproducing apparatus 11 is constantly viewed by the user after being copied to the mobile apparatus 14, the video recording/reproducing apparatus 11 may also provide the recommending content more fit for the user's preference.

FIG. 11 is a block diagram showing another functional configuration example of the video recording/reproducing apparatus 11 in FIG. 1.

The video recording/reproducing apparatus 11 in FIG. 11 is provided with a copying control unit 701 and a preference information management unit 702 as substitutes for the copying control unit 63 and the preference information management unit 68 of the video recording/reproducing apparatus 11 in FIG. 2, and copies the operation/viewing history information 351 (See FIG. 5) of the object for copy together with the title to be specified as the object for copy, when copying of the title is required. It is to be noted that like reference numerals are given to like units as those in FIG. 2, so that their description is passed over.

Like the copying control unit 63 in FIG. 2, the copying control unit 701 causes the selection display 501 (See FIG. 7) for selection of the object for copy to be displayed on the display apparatus 12 based on the recording title information supplied from the recording title management unit 67. Further, provided that the title corresponding to the check-marked check box 511 given by the user is specified as the object for copy, the copying control unit 701 reads out the object for copy from the auxiliary storage device 40 in response to the command from the input unit 41.

Then, the copying control unit 701 controls the recording title management unit 67, so that the program ID of the recording title information of the object for copy is supplied to the preference information management unit 702. The copying control unit 701 appends specific information as information specifying the video recording/reproducing apparatus 11 having been copied, before copying of the object for copy and the supplied operation/viewing history information 351 (See FIG. 5) from the preference information management unit 701 to the mobile apparatus 14 through the external interface 44 in FIG. 1. It is to be noted that the specific information may be an ID unique to the video recording/reproducing apparatus 11, or alternatively, when the copying control unit 701 manages a time (which is hereinafter referred to as a copying time) that the copying was effected, the copying time etc. is also available as the specific information.

Further, the copying control unit 701 reads out the operation/viewing history information 351 and the specific information from the mobile apparatus 14, causing the read operation/viewing history information 351 to be supplied to the preference information management unit 701 based on the read specific information.

Like the preference information management unit 68 in FIG. 2, the preference information management unit 702 creates the operation/viewing history information 351 based on the recording title information supplied from the recording title management unit 67, causing the created operation/viewing history information to be stored in the operation/viewing history DB 71. Further, the preference information management unit 702 updates the operation/viewing history information 351 contained in the operation/viewing history DB 71, while monitoring the viewing control unit 62 and the copying control unit 701.

Further, like the preference information management unit 68 in FIG. 2, the preference information management unit 702 generates the user's preference information data 401 based on the operation/viewing history information 351 contained in the operation/viewing history DB 71, causing the generated preference information data 401 to stored in the preference information DB 72 before being managed.

Further, the preference information management unit 702 reads out the operation/viewing history information 351 of the object for copy from the operation/viewing history DB 71 based on the program ID of the recording title information of the object for copy supplied from the recording title management unit 67, causing the read operation/viewing history information 351 to be supplied from the copying control unit 701.

Further, the preference information management unit 702 also updates the operation/viewing history information 351 contained in the operation/viewing history DB 71 based on the operation/viewing history information 351 supplied from the copying control unit 701.

FIG. 12 is a block diagram showing a functional configuration example of the mobile apparatus 14 connected to the video recording/reproducing apparatus 11 shown in FIG. 11 through the external interface 44.

The mobile apparatus 14 in FIG. 12 includes a viewing control unit 901, a reproducing unit 902, a preference information management unit 903, and an operation/viewing history DB 904.

In response to the command given by the user through the input unit 107 in FIG. 3, the viewing control unit 901 controls the reproducing unit 902, so that the title contained in the storage unit 105 is reproduced (or displayed). The reproducing unit 902 reproduces the title under control of the viewing control unit 901.

The preference information management unit 903 updates the operation/viewing history information 351 contained in the operation/viewing history DB 904, while monitoring the viewing control unit 62. The operation/viewing history DB 904 stores the operation/viewing history information 351 supplied from the copying control unit 701 in FIG. 11 and the appended specific information with respect thereto in such a manner as to be corresponded with each other.

Figure 13:
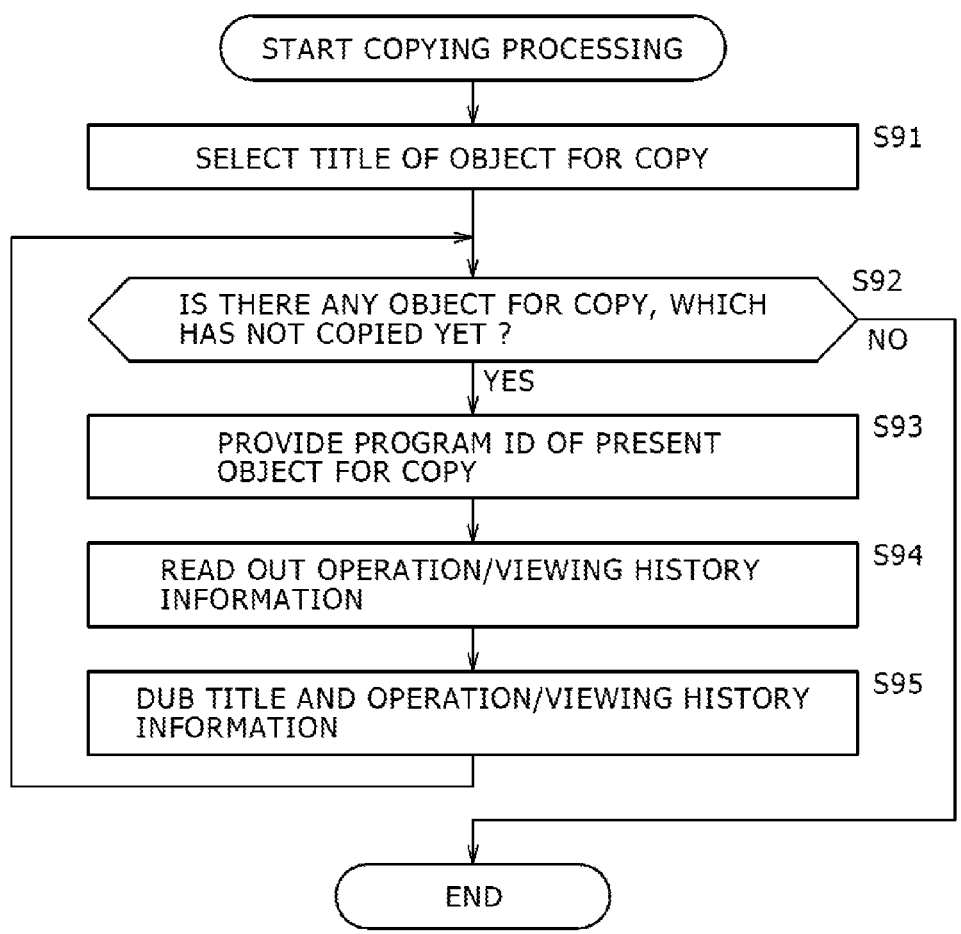
FIG. 13 is a flowchart for illustrating copying process.

The copying process required for the video recording/reproducing apparatus 11 in FIG. 11 to copy the title to the mobile apparatus 14 is now described with reference to FIG. 13. This copying process is started when the copying command was given by operating the input unit 41 by the user to select the execution button 513 after checking the check box 511 of the selection display 501 in FIG. 7.

The processing in steps S91 and S92 is the same as that in the steps S51 and 52 in FIG. 9, so that its description is passed over.

The processing in the step S92 is followed by a step S93, where the copying control unit 701 supplies the program ID of the recording title information of the present object for viewing to the preference information management unit 702, before the process goes on to a step S94.

In the step S94, the preference information management unit 702 reads out, from the operation/viewing history information DB 71, the operation/viewing history information 351 having the same content of the title ID 361 as the supplied program ID in the step S93, causing the read operation/viewing history information to be supplied to the copying control unit 701, before the process goes on to a step S95.

In the step S95, the copying control unit 701 effects appending of the specific information, before copying of the title specified as the present object for copy and the supplied operation/viewing history information 351 in the step S94 to the storage unit 105 of the mobile apparatus 14 through the external interface 44, leading to an end of the process.

As described the above, the user, if the title is once copied to the mobile apparatus 14 in FIG. 12, may watch the copied title at a desired place, with the mobile apparatus 14 carried after being removed from the video recording/reproducing apparatus 11 in FIG. 11, for instance. Specifically, in response to the viewing (or reproducing) command from the user, the viewing control unit 901 controls the reproducing unit 902, so that the title to be specified as the copied object for reproducing in the storage unit 105 is reproduced.

Further, the viewing control unit 901 controls the reproducing operation to be performed by the reproducing unit 902 depending on the operation given by the user to the input unit 107 for performing the reproducing-related process other than the reproducing process. The preference information management unit 903 updates the operation/viewing history information 351 in the operation/viewing history DB 904 based on the viewing time, the number of viewing or the number of operation of the title, while monitoring the viewing control unit 901.

When copying of a new title to the mobile apparatus 14 in FIG. 12 is required, the user makes reconnection between the mobile apparatus 14 and the video recording/reproducing apparatus 11 in FIG. 11. At this time, the video recording/reproducing apparatus 11 in FIG. 11 reads out the operation/viewing history information 351 and the specific information from the operation/viewing history DB 904 of the mobile apparatus 14, and updates the operation/viewing history information 351 in the operation/viewing history DB 71 based on both of the read operation/viewing history information 351 and the read specific information.

An operation/viewing history information update process required for the video recording/reproducing apparatus 11 in FIG. 11 to update the operation/viewing history information 351 is now described with reference to FIG. 14. This operation/viewing history information update process is started when the connection of the mobile apparatus 14 to the video recording/reproducing apparatus 11 is established, for instance.

In a step S111, the copying control unit 701 reads out (or receives) the operation/viewing history information 351 and the specific information from the operation/viewing history DB 904 of the mobile apparatus 14, before the process goes on to a step S112.

In the step S112, the copying control unit 701 decides based on the specific information whether or not the operation/viewing history information 351 of one's own copied title is contained in the read operation/viewing history information 351 in the step S111.

Specifically, when the ID of the video recording/reproducing apparatus 11 is given as the specific information, for instance, the copying control unit 701 decides whether or not one's own appended ID of the video recording/reproducing apparatus 11 agrees with the specific information. Alternatively, when the copying time is given as the specific information, the copying control unit 701 decides whether or not one's own managed copying time agrees with the specific information.

When the result of decision in the step S112 is that the operation/viewing history information 351 of one's own copied title is contained, the process goes on to a step S113, where the copying control unit 701 supplies the operation/viewing history information 351 of one's own copied title to the preference information management unit 702, before the process goes on to a step S114.

In the step S114, the preference information management unit 702 updates, based on the title ID 361 of the supplied operation/viewing history information 351 in the step S113, the operation/viewing history information 351 corresponding to the same title ID 361 as the title ID 361 of the supplied operation/viewing history information 351, providing the operation/viewing history information 351 to be supplied in the step S113.

The processing in the Step S114 is followed by a step S115, where the preference information management unit 702 decides whether or not the values of the cumulative viewing time 362, the number of viewing 363 and the number of operation 364 of the operation/viewing history information 351 are less than the prescribed threshold value. When the result of decision is that the above values are less than the prescribed threshold value, the process is brought to an end.

Conversely, when the result of the decision in the step S115 is that the values of the cumulative viewing time 362, the number of viewing 363 and the number of operation 364 of the operation/viewing history information 351 are not less than the prescribed threshold value, the process goes on to a step S116, where the preference information management unit 702 reads out the recording title information corresponding to the updated operation/viewing history information 351 in the step S114 from the recording title information DB 70 through the recording title management unit 67, and updates the preference information data 401 in the preference information DB 72 based on the read recording title information, leading to an end of the process.

It is to be noted that the processing in the steps S115 and S116 needs to be taken for each updated operation/viewing history information given in the step S114.

Conversely, when the result of decision in the step S112 is that no operation/viewing history information 351 of one's own copied title is contained, the process skips the steps S113 and S114, leading to an end of the process.

As described the above, the video recording/reproducing apparatus 11 in FIG. 11 permits one's own contained operation/viewing history information 351 to be updated after acquiring, from the mobile apparatus 14 in FIG. 12, the operation/viewing history information 351 of one's own copied title, that is, the operation/viewing history information 351 in which the viewing time, the number of viewing and the number of operation in the mobile apparatus 14 are all reflected, so that the preference information data 401 created based on the updated operation/viewing history information 351 results in more exact preference information data.

While the above is described as related to the recording schedule taken through the operation given by the user to select the content data to be specified as the object for recording schedule among the recommending content, it is to be understood that the present invention is not limited to the above selecting operation given by the user, and it is also allowable to automate the recording schedule of the recommending content. Alternatively, it is also allowable to take the recording schedule in such a manner that automated recording schedule is used for the content involving the corresponding preference information data 401 exceeding the prescribed threshold value among the recommending content, while the recording schedule through the operation by the user is used for only the content data selected as the object for recording schedule among the remaining recommending content.

The number of operation 364 may be also in the form of information representing not only the reproducing-related operations having been given by the user in the course of replay of the title, but also a number at which the operation for recording the content data was given by the user.

As described the above, the video recording/reproducing apparatus 11, when the object for copy is copied, ensures that the preference information management unit 68 updates the preference information data 401 associated with the title of the copied object for copy, permitting the preference information data 401 to be acquired with higher accuracy.

It is to be understood in the present specification that the steps describing the program stored in the program recording medium includes not only time-series processing to be performed in described sequence, but also processing to be performed in parallel or individually although not always performed in time series.

It is to be also understood that the embodiments of the present invention are not limited to the above, and various changes may be made without departing from the spirit and scope of the invention.

The invention claimed is:

1. An information processing apparatus, comprising:
   an acquiring unit adapted to acquire preference information representing a user's preference based on an operation given by the user regarding content;
   a recording unit adapted to record content;
   a selecting unit adapted to select the recorded content and to designate the selected content as an object for copying; and
   a copying unit adapted to copy the selected content to a mobile apparatus having capability of viewing content;
   wherein upon copying the content to the mobile apparatus, the acquiring unit updates the preference information associated with the content of the copied object based on information of the content of the copied object described as a group of information,
   wherein the group of information includes an estimate of one or more actions performed on the content copied to the mobile apparatus.

2. The information processing apparatus according to claim 1, wherein the group of information includes at least one of program identification information of the content of the copied object or operation/viewing history information of the content of the copied object.

3. The information processing apparatus according to claim 2, wherein the operation/viewing history information of the content of the copied object includes cumulative viewing time, number of viewings or number of operations representing a number at which the operation is given by the user during replay of the content of the copied object.

4. The information processing apparatus according to claim 3, further comprising:
   a deciding unit adapted to decide whether the content that is the object for copying has been viewed;
   wherein if a result of the decision by the deciding unit is that the content has not been viewed, the acquiring unit estimates the number of operations, the number of viewings or the viewing time of the content of the object for copying in the mobile apparatus, and updates the preference information based on the estimated number of operations, number of viewings or viewing time.

5. The information processing apparatus according to claim 4, wherein:
   an increase or decrease change range of a value in the number of operations, the number of viewings, or the viewing time for the content that is the object of copying in another information processing apparatus, which are estimated by the acquiring unit, is changed depending on the other information processing apparatus to which the copied object for copying is sent.

6. The information processing apparatus according to claim 3, further comprising:
   a receiving unit adapted to receive the number of operations, the number of viewings or the viewing time of the content of the object;
   wherein the acquiring unit updates the preference information based on the number of operations, the number of viewings or the viewing time received by the receiving unit.

7. The information processing apparatus according to claim 1, wherein the information of the content of the copied object described as the group of information is described in a table.

8. The information processing apparatus according to claim 1, further comprising:
   an estimating unit adapted to estimate content fit for the user's preference based on the preference information; and
   a presenting unit adapted to present to the user, information relating to the estimated content.

9. The information processing apparatus according to claim 8, further comprising:
   a receiving unit adapted to receive the estimated content; and
   a recording controller unit adapted to cause the received content to be recorded.

10. The information processing apparatus according to claim 1, further comprising a presentation unit configured to display recommended content information based on program identification information of the recommended content.

11. The information processing apparatus according to claim 10, wherein a user associated with the information processing apparatus makes a selection of the recorded content, that is an object for copying through an input unit, from the displayed recommended content information.

12. An information processing method of one or more processors, the method of the one or more processors comprising:
    the one or more processors controlling:
       acquiring preference information representing a user's preference based on an operation given by a user regarding content;
       recording content;
       selecting the recorded content as an object for copying;
       copying the selected content to a mobile apparatus having capability of viewing content;
       updating the preference information associated with the content of the copied object, upon copying the content to the mobile apparatus, based on information of the content of the copied object described as a group of information, wherein the group of information includes an estimate of one or more actions performed on the content copied to the mobile apparatus.

13. A non-transitory computer readable medium having a program causing a computer to perform an information processing method, the method comprising:

acquiring preference information representing a user's preference based on an operation given by the user regarding content;
recording content;
selecting the recorded content that is an object for copying;
copying the selected content to a mobile apparatus having capability of viewing content;
updating the preference information associated with the content of the copied object, upon copying the content to the mobile apparatus, based on information of the content of the copied object described as a group of information, wherein the group of information includes an estimate of one or more actions performed on the content copied to the mobile apparatus.

* * * * *